US006966456B2

(12) United States Patent
Margalit

(10) Patent No.: US 6,966,456 B2
(45) Date of Patent: Nov. 22, 2005

(54) SYSTEM FOR FEEDING PORTIONS OF MATERIAL TO AN INJECTION MOLDING MACHINE

(76) Inventor: Eli Margalit, M.B., Moshav Yaad 20155 (IL)

( * ) Notice: Subject to any disclaimer, the term of this patent is extended or adjusted under 35 U.S.C. 154(b) by 0 days.

(21) Appl. No.: 10/700,477

(22) Filed: Nov. 5, 2003

(65) Prior Publication Data

US 2004/0099685 A1 May 27, 2004

Related U.S. Application Data

(63) Continuation of application No. 10/386,472, filed on Mar. 13, 2003, now Pat. No. 6,688,493, which is a continuation of application No. 09/751,560, filed on Jan. 2, 2001, now abandoned.

(51) Int. Cl.[7] ............................................ G01F 11/00
(52) U.S. Cl. ............................ 222/1; 222/58; 222/63; 222/77; 222/413
(58) Field of Search ............................ 222/1, 58, 63, 222/77, 413, 460, 462

(56) References Cited

U.S. PATENT DOCUMENTS

| | | | | |
|---|---|---|---|---|
| 3,198,395 | A | | 8/1965 | McKinney |
| RE27,115 | E | | 4/1971 | Goff et al. |
| 4,722,456 | A | | 2/1988 | Laidlaw et al. |
| 4,762,252 | A | | 8/1988 | Hyer et al. |
| 4,804,111 | A | * | 2/1989 | Ricciardi et al. ............. 222/77 |
| 5,103,401 | A | | 4/1992 | Johnson |
| 5,361,945 | A | | 11/1994 | Johanson |
| 5,387,308 | A | | 2/1995 | Heavrin |
| 5,409,137 | A | | 4/1995 | Bonomelli |
| 5,423,455 | A | | 6/1995 | Ricciardi et al. |
| 5,713,494 | A | | 2/1998 | Kaiju et al. |
| 5,988,461 | A | | 11/1999 | Edney et al. |
| 6,060,667 | A | * | 5/2000 | Pollock ...................... 177/121 |
| 6,155,709 | A | | 12/2000 | O'Callaghan |
| 6,168,305 | B1 | * | 1/2001 | Marmsater .................. 700/240 |
| 6,354,465 | B2 | | 3/2002 | Bell et al. |
| 6,446,836 | B1 | * | 9/2002 | Aalto et al. ................... 222/58 |
| 6,688,493 | B2 | * | 2/2004 | Margalit ........................ 222/1 |

FOREIGN PATENT DOCUMENTS

| | | |
|---|---|---|
| DE | 19820709 | 11/1998 |
| EP | 0512303 | 11/1992 |
| JP | 05318531 | 12/1993 |
| JP | 08150622 | 6/1996 |
| WO | WO 00/59708 | 10/2000 |

* cited by examiner

*Primary Examiner*—Joseph A. Kaufman
(74) *Attorney, Agent, or Firm*—Browdy and Neimark, PLLC

(57) ABSTRACT

A method for calculating the average weight of each of a plurality of portions of material fed from a hopper. The method is carried out by: first weighing the hopper; after the first weighing, dispensing a given plurality of portions of material; then, in a second weighing step, again weighing the hopper; calculating the difference between the weight of the hopper determined in the first weighing step and the weight of the hopper determined in the second weighing step, the difference constituting the loss of weight of the hopper; and dividing the loss of weight of the hopper by the given plurality of portions. The weighing steps may be performed with a weighing device having a load cell and the given plurality of portions is equal to at least the number calculated by dividing the sensitivity of the load cell by the estimated weight of each fed portion.

18 Claims, 2 Drawing Sheets

SYSTEM FOR FEEDING PORTIONS OF MATERIAL TO AN INJECTION MOLDING MACHINE

This is a continuation of U.S. application Ser. No. 10/386,472, filed on Mar. 13, 2003 now U.S. Pat. No. 6,688,493, which is a continuation of U.S. application Ser. No. 09/751,560, filed on Jan. 2, 2001 now abandoned.

FIELD AND BACKGROUND OF THE INVENTION

The present invention relates to a field of a molding machine and, in particular, concerned to a system for feeding portions of material to a plastic-injection molding machine.

Several weight feeding apparatus and systems are known. These apparatus and systems are for feeding a large quantity of material. When a small quantity is needed, e.g., coloring material, in a producing system, volume methods are used to achieve the needed weight. Volume methods are used for feeding small quantities because of the difficulty of weighing a few grams in the production area, which is very noisy and shaky.

Volume feeding methods, which are used to achieve weight feeding, have some disadvantages. The specific gravity of a material can be changed e.g., in a new production batch, and therefore a new scaling is needed. The volume-weight scaling is a long process and requires skilled workers. Moreover, since the fed volume cannot be controlled the volume-feeding method assumes that the feeder dispenses equal portions permanently and therefore ignores the material streaming problems.

Feeding hopper usually has an outlet to feed the material. Part of the material, the material in the shaft that is perpendicular to the outlet, does not press on the hopper. This "outlet-shaft" causes an error in the hopper weighing since the material in the outlet-shaft or at least part of this material is not weighed. Load cells are calibrated when weighing such hoppers.

There is therefore a recognized need for, and it would be highly advantageous to have, a system for feeding portions of material to an injection-molding machine with the ability to accurately weigh feeding of small quantities of material.

BRIEF SUMMARY OF THE INVENTION

The present invention is a system for feeding portions of material to an injection-molding machine with the ability to accurately weigh feeding of small quantities of material.

According to the teachings of the present invention there is provided, a system for feeding portions of material to an injection molding-machine including (a) a feeding means; (b) a container, with a fill opening and an outlet, and the container is installed with the feeding means; (c) a material hopper, with a fill opening and an outlet, and the material hopper is located inside the container; (d) a load cell that is coupled to the material hopper, and (e) a controller operative for: (i) calculating the weight of fed material, using the load cell and loss-in-weight method, and (ii) controlling the feeding means.

According to further features in the described preferred embodiments, the material hopper of the system has a funnel shaped lower part and an upper part and wherein the upper part has the same cross-section-area in each vertical level. The upper part of the material hopper can have inclined parallel-walls.

According to further features in the described preferred embodiments, the controller of the system is further operative for command the feeding means to dispense at least one portion of material from the material hopper, wherein each portion is dispensed in a given time and for a given interval of time in order to dispense portions with a predetermined weight.

According to further features in the described preferred embodiments, the controller is further operative for it calculates the weight of the dispensed portion by (1) dispensing a number of portions; (2) calculating the weight of the number of portions, using loss-in-weight method, and (3) dividing the weight of the number of portions to the number of the portions.

According to further features in the described preferred embodiments, the feeding means is a screw feeder and the controller is further operative for adjusting the weight of the further portion by increasing or decreasing the spin speed of the screw feeder, if the weight of the portion differs from the predetermined weight.

According to further features in the described preferred embodiments, the outlet of the material hopper is shifted and elevated from the outlet of the container.

According to yet another aspect of the present invention there is provided a material hopper for accurate weighing including (a) a funnel shaped lower part with outlet, and (b) a parallel or cylinder walls upper part wherein the walls can be inclined.

According to yet another aspect of the present invention there is provided a method of accurate weighing of a fed portion including (a) storing the material in a material hopper that it's upper part is an inclined cylinder or an inclined parallel walls; (b) feeding a predetermined number of portions; (c) calculating the weight of the number of portions, using loss-in-weight of the material hopper using a load cell, and (d) calculating the weight of each portion of the number of portions by dividing the weight of the number of portions to the number of the number of portions. The predetermined number of portions can be calculating by dividing the sensitivity of the load cell to the estimated weight of the fed portion.

The present invention successfully addresses the shortcomings of the existing technologies by providing a system for feeding portions of material to an injection-molding machine with the ability to accurately weigh feeding of small quantities of material.

DESCRIPTION OF THE PREFERRED EMBODIMENTS

The present invention is a system for feeding portions of material to an injection-molding machine with the ability to accurately weigh feeding of small quantities of material.

The principles and operation of the system according to the present invention may be better understood with reference to the drawings and the accompanying description.

As used herein in the specification and in the claims section that follows, the term "loss-in-weight" refers to a known method for weighing the material that has been dispensed or spent from a hopper, by weighing the hopper before taking from it having a pre-dispensing weight and secondly weighing the hopper after taking from it having an after-dispensing weight then obtaining a weight-loss of the hopper, which is the weight of the taken material, by subtracting the after-dispensing weight from the pre-dispensing-weight.

As used herein in the specification and in the claims section that follows, the term "outlet-shaft" refers to the part of the material in a hopper that is located in the shaft that extends perpendicularly to the outlet of the hopper and do not press on the hopper walls.

Figure 1:
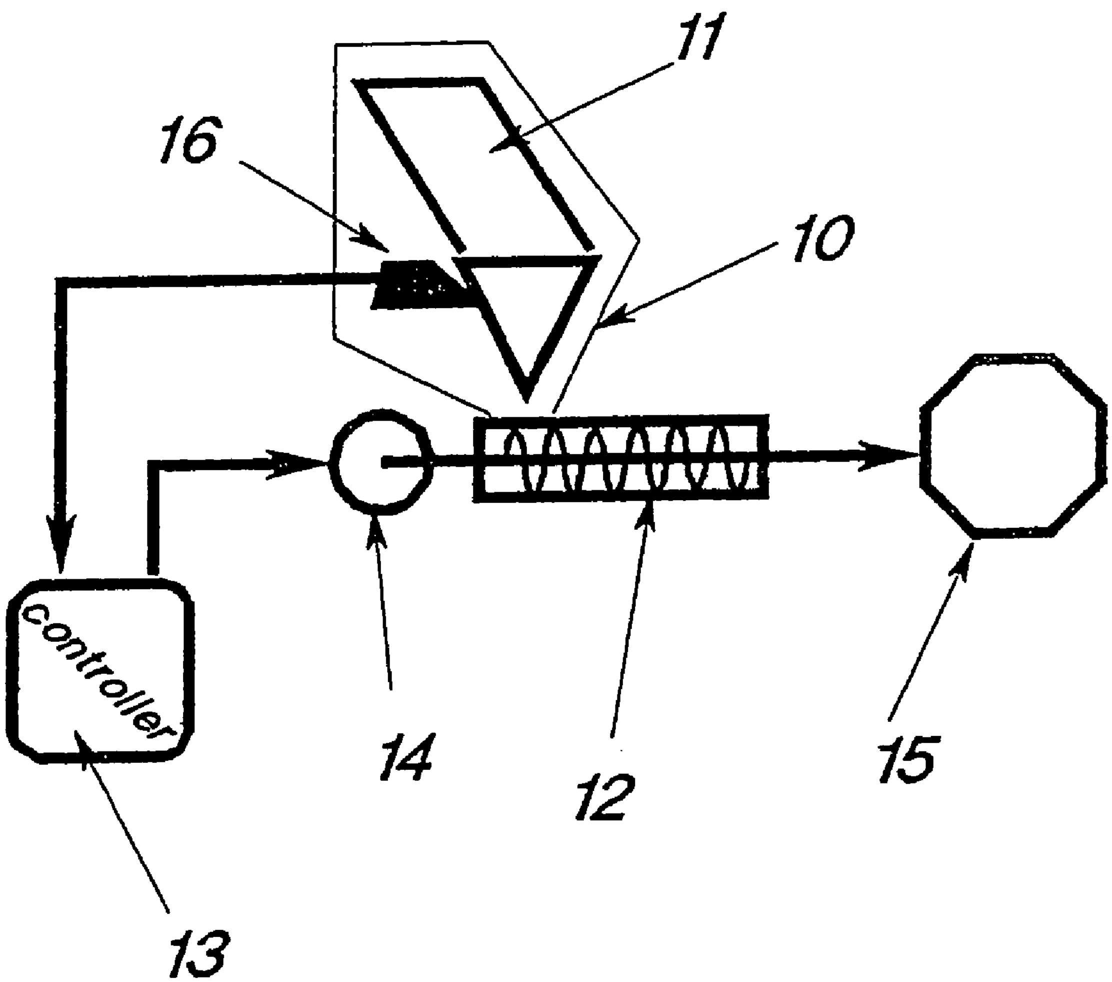
FIG. 1 is an illustration of a schematic block diagram of the system.

Referring now to the drawings, FIG. 1 illustrates a schematic block diagram of the system. The system includes a container 10, a material hopper 11 located inside the container 10, a load cell 16 coupled to the material hopper 11, a controller 13 that calculates weight according to the load cell 16 information and commands the motor 14 of the screw feeder 12 to dispense portions of material into the molding-machine 15.

The upper part of the hopper 11 has inclined walls. This shape enables to keep the material in the outlet-shaft, constant by keeping minimal level of material in the hopper. Moreover, the walls of the upper part of the hopper 11 are parallel, for this reason the shape of each new space in the hopper 11 that is created by each dispensed portion. Therefore the profile of the material-pressure, in the hopper 11, remains constant. The inclined and parallel walls of the hopper 11 minimize the weight errors and facilitate the weight calibration.

The material must be fed to the molding machine in accurate-weight portions and each portion must be fed in a given time and in a given duration. To achieve this target the controller 13 commands the motor 14 of the screw feeder 12 to start rotating in a specific spin in the given time for a given duration. Since the given time and duration of feeding are given by the molding machine 15, the screw feeder 12 spin is the only variable that can be used to control the weight of the fed portion. In the first time, the controller 13 gets a first weight of the hopper 11 from the load cell 16 and commands the motor 14 to rotate the screw feeder 12 for the given duration and a given spin that is predetermined by the system operator. After dispensing a predetermined number of portions the controller 13 gets a second weight of the hopper 11. The controller 13 obtains the total weight of the fed portions using the first weight of the hopper 11, the second weight of the hopper 11 and loss-in-weight method. The controller 13 obtains the portion weight by dividing the total weight to the number of fed portions. If the portion weight differs from a predetermined weight, the controller 13 adjusts the portion weight by increasing or decreasing the spin of the motor 14 of the screw feeder 12, in the next set of portions. This process can be done sequentially or in a predetermined time.

Figure 2:
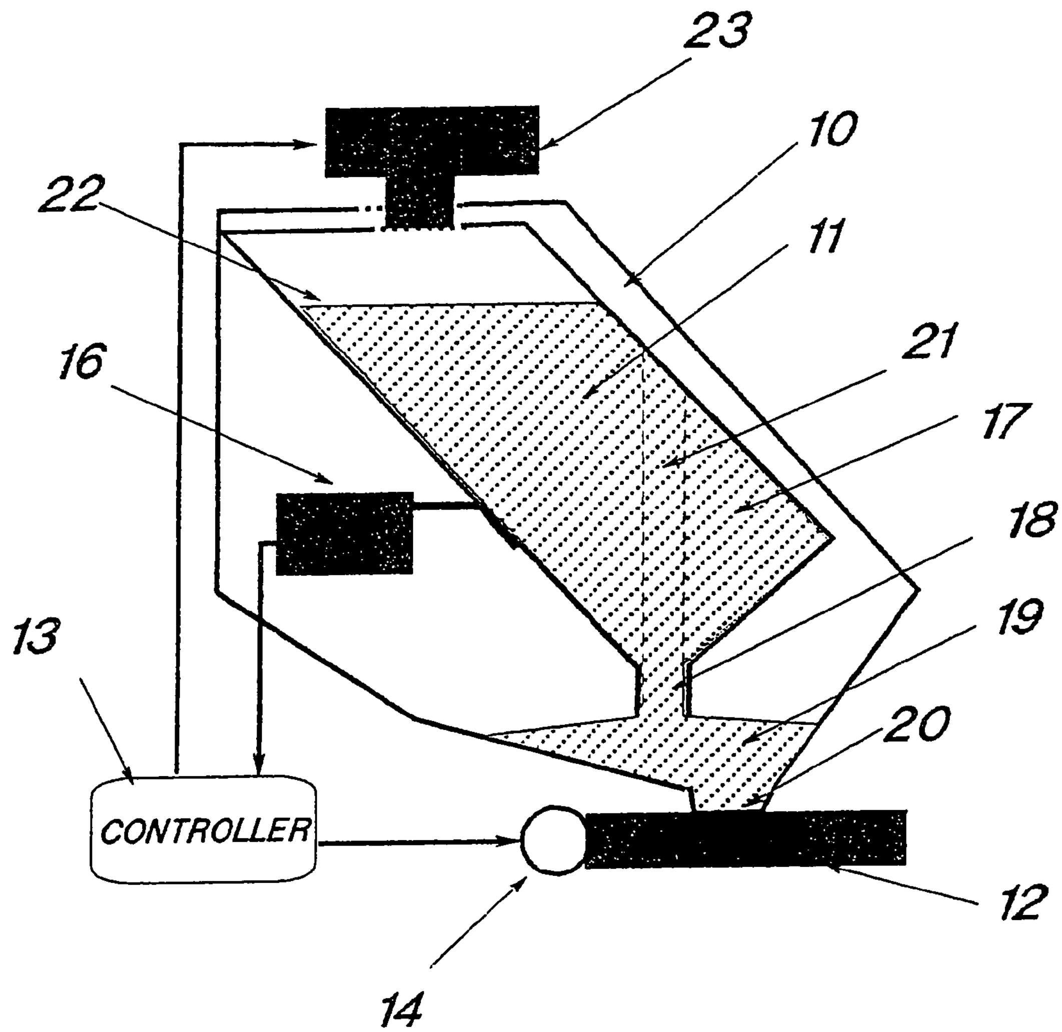
FIG. 2 is an illustration of a systems' cross-section while material is in the material hopper and the system is in a work or ready to work position.

FIG. 2 illustrates the cross-section of the system while material is in the material hopper and the system is in a work or ready to work position. The material 17 fills the material hopper 11. The material 17 is fed through an outlet 18 of the material hopper 11 to a space 19 created between outlet 23 of the material hopper and an outlet 20 of the container 10, from this space 19 the material 17 is fed through the outlet 20 of the container to the screw feeder 12. The outlet 18 of the material hopper is shifted from the outlet 20 of the container to enable keeping the outlet-shaft 21 constant as long as the material level 22 is higher than the upper end of the outlet-shaft 21 and isolates the material hopper 11 from noise and shaking which is coming from the screw feeder 12 and its motor 14. The controller 13 commands a refill means 23 to refill the material hopper 11 when the material level 22 reduced to a threshold level. Part of the material 17 is located in the space 19 and acts as a buffer. This buffer isolates the material hopper 11 and prevents noises and shakings of the screw feeder 12 and its motor 14, to enable an accurate weighing of the material hopper 11 by the load cell 16.

It will be appreciated that the above descriptions are intended only to serve as examples, and that many other embodiments are possible within the spirit and the scope of the present invention.

What is claimed is:

1. A method for controlling the average weight of each portion of a plurality of portions of material fed to an injection molding system from a feeding system that comprises at least a hopper and a weighing device, said method comprising:

in a first weighing step, weighing said hopper;

after said first weighing step, dispensing a plurality of portions of material, the plurality of portions being constituted by a given number of portions;

in a second weighing step, after said dispensing step, weighing said hopper;

calculating the difference between the weight of said hopper determined in said first weighing step and the weight of said hopper determined in said second weighing step, the difference constituting the loss of weight of said hopper; and dividing the loss of weight of said hopper by the said given number of said plurality of portions.

2. The method of claim 1, wherein the hopper comprises:

a lower part provided with an outlet having a periphery;

an upper part provided with a fill opening, wherein said upper part has a wall that is located to form an upper boundary of a region enclosed by a vertical projection of said periphery and the entire said fill opening is located above, and is horizontally offset from, said upper boundary of said region.

3. The method of claim 1, wherein the hopper comprises:

a lower part provided with an outlet;

an upper part provided with a fill opening and an inclined wall or an upper boundary, wherein said inclined wall has a portion or said upper boundary has a region that is located above said outlet, and is delimited by a vertical projection of said outlet, and the entire said fill opening is located above said inclined wall portion, and is horizontally offset from said inclined wall portion.

4. The method of claim 3 further comprising:

controlling the delivery of material to said hopper to maintain said hopper filled with material to the level at or above said portion of said inclined wall, thereby causing said hopper to remain filled with material to a level at or above said inclined wall portion as material is being dispensed via said outlet.

5. The method of claim 4, wherein said upper part of said hopper has parallel sidewalls or a cylindrical sidewall.

6. The method of claim 5, wherein said lower part of said hopper has a funnel-shaped part.

7. The method of claim 1, wherein:

said hopper has a lower part provided with an outlet;

said method further comprises disposing said hopper into a container having an outlet that is horizontally offset from, and located below, said outlet of said hopper; and said step of dispensing is carried out by feeding material from said hopper outlet to said container and then from said container outlet to a feeder that dispenses the plurality of portions of material.

8. The method of claim 1, wherein said step of dispensing is carried out by operating a feeder to dispense successive portions of material from said hopper, wherein each said portion is dispensed in a given time and for a given interval of time, and controlling said feeder to dispense more or less material during subsequent intervals of time depending on whether the calculated portion weight is more or less than a predetermined portion weight.

9. The method of claim 1, wherein said hopper has a lower part provided with an outlet, and further wherein said step of dispensing is carried out by operating a screw feeder that feeds material by rotating at a controlled speed to dispense successive portions of material from said hopper.

10. A method for controlling the average weight of each of portion of a plurality of portions of material fed to an injection molding machine from a feeding system that comprises at least a hopper and a weighing device, said method comprising:

in a first weighing step, weighing said hopper;

after said first weighing step, dispensing a plurality of portions of material, the plurality of portions being constituted by a given number of portions;

in a second weighing step, after said dispensing step, weighing said hopper;

calculating the difference between the weight of said hopper determined in said first weighing step and the weight of said hopper determined in said second weighing step, the difference constituting the loss of weight of said hopper; and dividing the loss of weight of said hopper by the said given number of said plurality of portions, wherein said weighing steps are performed with a weighing device and the given number of portions is equal to at least the number calculated by dividing the sensitivity of said weighing device by an estimated or desired weight of each fed portion, and wherein said estimated or desired weight of each fed portion is smaller than said sensitivity.

11. The method of claim 10, wherein the hopper comprises:

a lower part provided with an outlet having a periphery;

an upper part provided with a fill opening, wherein said upper part has a wall that is located to form an upper boundary of a region enclosed by a vertical projection of said periphery and the entire said fill opening is located above, and is horizontally offset from, said upper boundary of said region.

12. The method of claim 10, wherein the hopper comprises:

a lower part provided with an outlet;

an upper part provided with a fill opening and an inclined wall or an upper boundary, wherein said inclined wall has a portion or said upper boundary has a region that is located above said outlet, and is delimited by a vertical projection of said outlet, and the entire said fill opening is located above said inclined wall portion, and is horizontally offset from said inclined wall portion.

13. The method of claim 12 further comprising:

controlling the delivery of material to said hopper to maintain said hopper filled with material to the level at or above said portion of said inclined wall, thereby causing said hopper to remain filled with material to a level at or above said inclined wall portion as material is being dispensed via said outlet.

14. The method of claim 13, wherein said upper part of said hopper has parallel sidewalls or a cylindrical sidewall.

15. The method of claim 14, wherein said lower part of said hopper has a funnel-shaped part.

16. The method of claim 10, wherein:

said hopper has a lower part provided with an outlet;

said method further comprises disposing said hopper into a container having an outlet that is horizontally offset from, and located below, said outlet of said hopper; and said step of dispensing is carried out by feeding material from said hopper outlet to said container and then from said container outlet to a feeder that dispenses the plurality of portions of material.

17. The method of claim 10, wherein said step of dispensing is carried out by operating a feeder to dispense successive portions of material from said hopper, wherein each said portion is dispensed in a given time and for a given interval of time, and controlling said feeder to dispense more or less material during subsequent intervals of time depending on whether the calculated portion weight is more or less than a predetermined portion weight.

18. The method of claim 10 wherein said hopper has a lower part provided with an outlet, and further wherein said step of dispensing is carried out by operating a screw feeder that feeds material by rotating at a controlled speed to dispense successive portions of material from said hopper.

* * * * *